May 4, 1965  A. MELETTI  3,182,139
ELECTRIC CORD REEL
Filed May 26, 1961  5 Sheets-Sheet 2

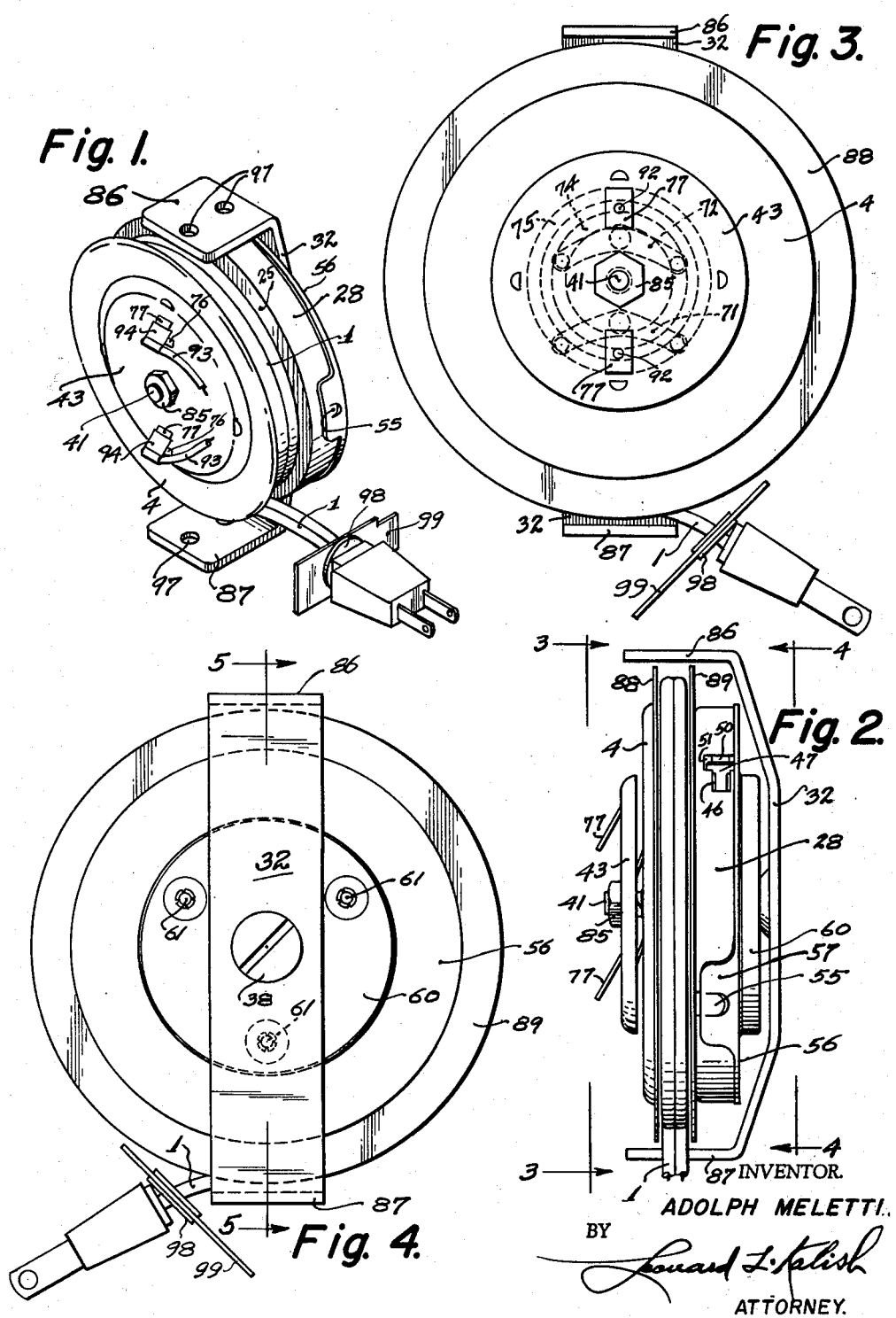

INVENTOR.
ADOLPH MELETTI
BY
Leonard L. Kalish
ATTORNEY.

May 4, 1965 A. MELETTI 3,182,139
ELECTRIC CORD REEL
Filed May 26, 1961 5 Sheets-Sheet 3
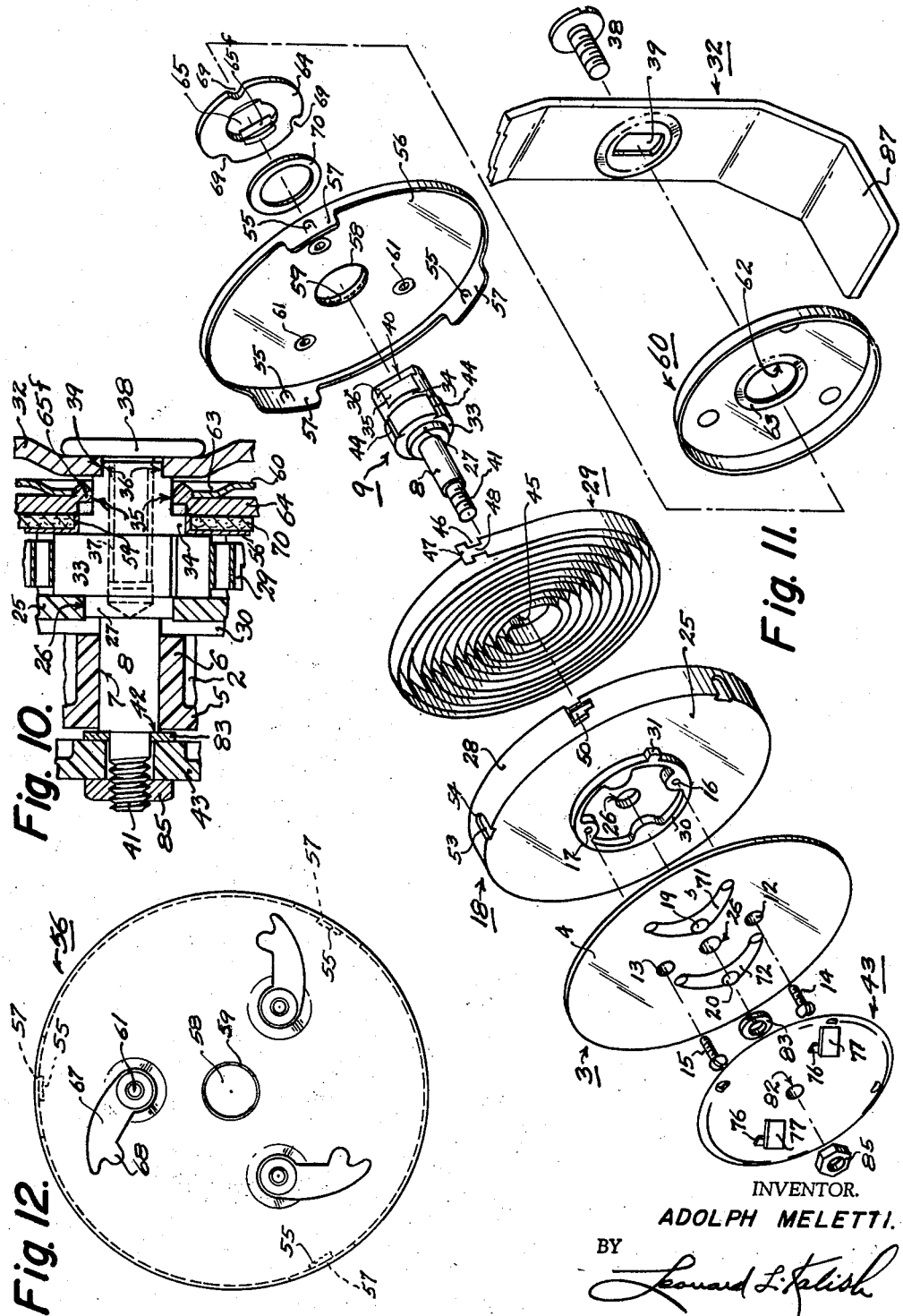
INVENTOR.
ADOLPH MELETTI.
BY
Leonard L. Kalish
ATTORNEY May 4, 1965
A. MELETTI
3,182,139
ELECTRIC CORD REEL
Filed May 26, 1961
5 Sheets-Sheet 4
Fig. 14.
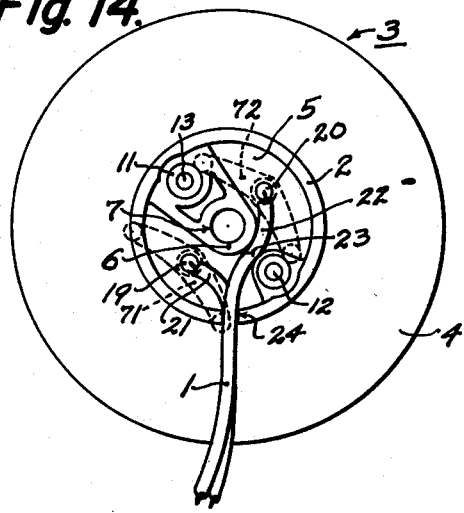
Fig. 13.
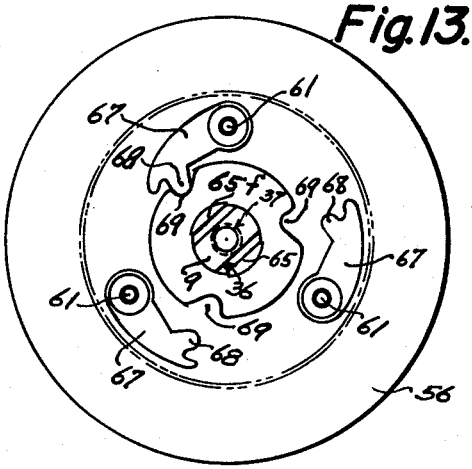
Fig. 18.
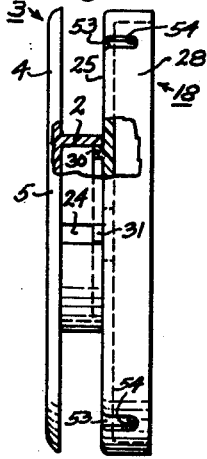
Fig. 19.
Fig. 20.
Fig. 16.
Fig. 15.
Fig. 17.
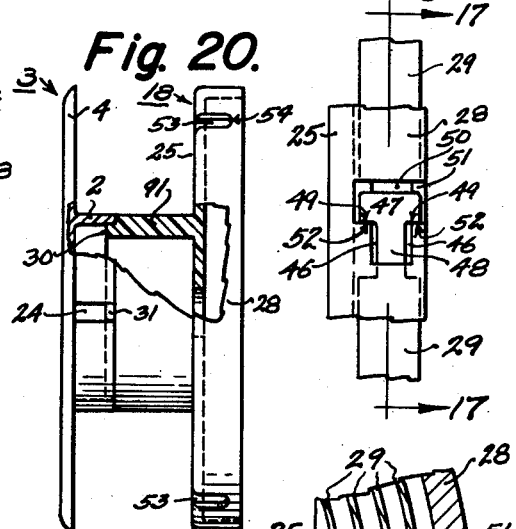
INVENTOR.
ADOLPH MELETTI.
BY
Leonard L. Kalish
ATTORNEY.

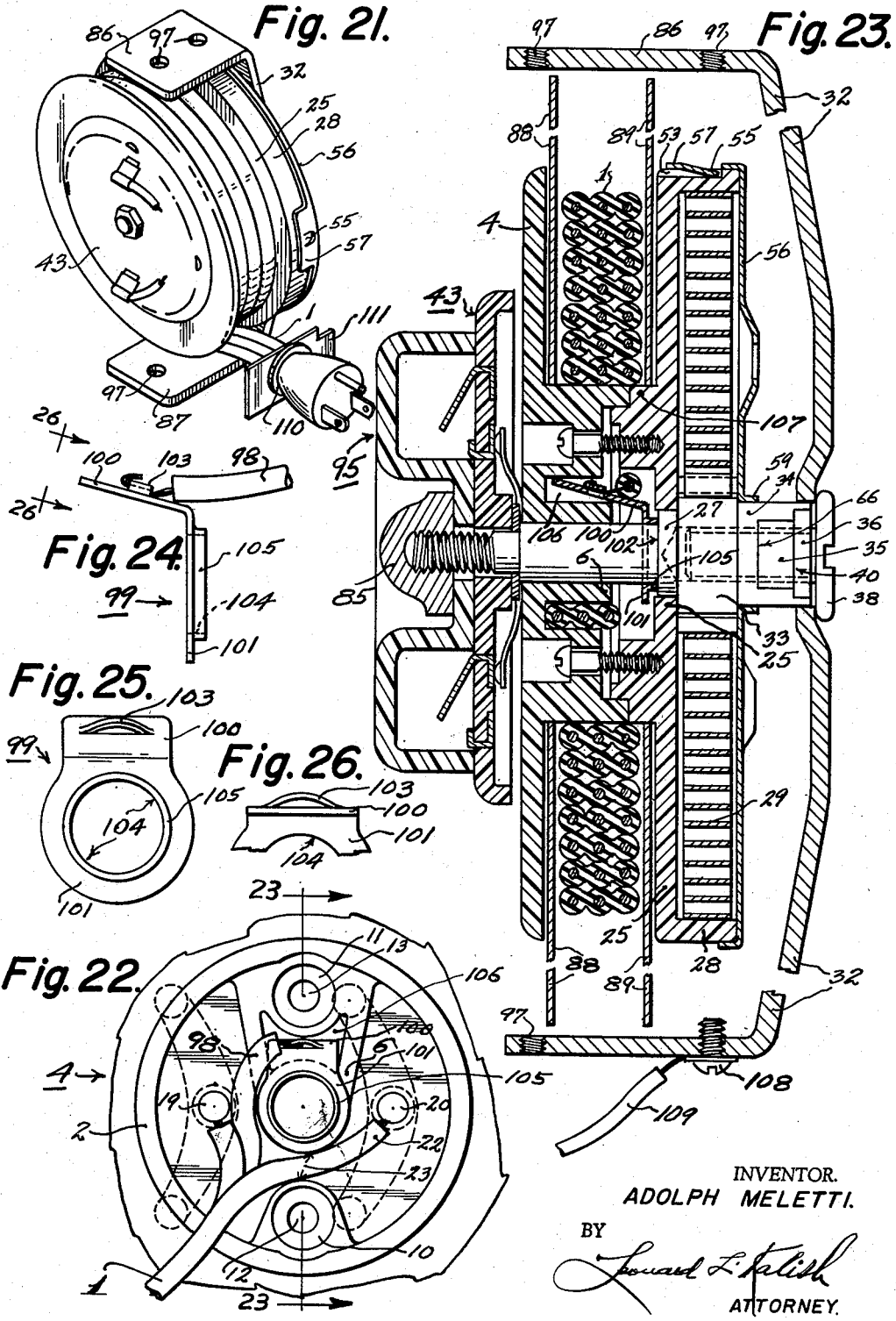

United States Patent Office 3,182,139
Patented May 4, 1965

3,182,139
ELECTRIC CORD REEL
Adolph Meletti, Brigantine, N.J., assignor to Vacuum Cleaner Corporation of America, Philadelphia, Pa., a corporation of Pennsylvania
Filed May 26, 1961, Ser. No. 112,821
12 Claims. (Cl. 191—12.4)

The present invention relates to a new and useful electrical cord reel for appliances and the like and it relates more particularly to certain novel features of construction whereby a light-weight, compact, low-cost and yet durable electrical cord reel is provided for many large-scale uses in or with electrical appliances and for similar uses, and whereby cords of different lengths may be accommodated by the same basic structure with merely changing the diameter of the interchangeable flanges for retaining the reeled cord and whereby the axial distance between the permanent flanges (which retain the reeled cord) may also be varied while still retaining the same basic structure and whereby the stationary electrical leads may be alternatively applied either by a slip-on connection or by a soldered connection confined within a removable insulating cover.

In one aspect, the present invention includes two separate juxtaposed molded electrically-insulating or dielectric members, each providing one of the two cord-retaining reel-flanges; one comprising a cord-terminal carrying flange-member and the other comprising a spring-housing and flange member, at least one of said flange-members having a hollow hub-portion and a bearing therewithin formed integrally therewith and cord-snubbing means within said hub-portion and integral therewith, and a projection on the other cord-flange member adapted to nest within the aforementioned hub-portion thereby to maintain the two cord-flange members in co-axial relation to each other and including also a projection adapted to enter and nest within a registering recess in the hub portion for interlocking two members against relative rotation.

Another aspect or feature of the present invention is a spring-housing cord-flange construction, including a stepped spring-anchorage notch in an outer cylindrical periphery of the spring-housing flange-member, a plurality of cover-retaining notches in the outer surface of said cylindrical periphery, and a metallic spring-housing-closure having a central bearing aperture therethrough coaxial with the spring-housing and having peripheral portions overlying the outer periphery of the spring-housing in closely nested relation thereto and including resilient latching detents pressed therefrom in a radially inward direction, with the free ends thereof facing the closure member and adapted to snap into the aforementioned recesses in the outer periphery of the insulating spring-housing to thereby lock the closure thereto.

Another aspect or feature of the present invention is the housing and disposition of the reel locking and releasing mechanism between the aforementioned spring-housing-cover and an auxiliary cover secured thereto.

Another aspect or feature of the present invention is a certain cord-on-cord construction, whereby the distance between the two cord-retaining flanges is no more than the width or diameter of the cord (plus adequate clearance), and insufficient to permit successive convolutions of the reeled cord to lie side-by-side, and whereby the successive convolutions of the reeled cord will have a common median plane at a right angle to the axis of the reel. This minimizes if not indeed eliminates twisting of the cord as the cord is alternately paid out and retracted.

A further feature or aspect of the present invention is a construction whereby the same components may be utilized to accommodate cords of substantially different lengths in the aforementioned cord-on-cord disposition, namely, by providing interchangeable and removable thin cord-retaining discs which may be centered on the hub adjacent the permanent flanges, and of the diameter larger than the diameter of the permanent flanges; such thin removable discs being variable in diameter to vary the cord-capacity of the reel with such cord-on-cord disposition or arrangement.

Another aspect or feature of the present invention relates to the alternative arrangement or reeling of the cord in a side-by-side disposition of successive convolutions therof, whereby a variation of the axial spacing between the permanent cord-retaining flanges is obtainable, so as to vary the cord-capacity of the reel in an axial direction while still utilizing most of the same basic components. In this aspect of the invention the electrically insulating spring-housing has formed thereon a hub portion of the same external diameter as that of the hub portion of the brush-carrying flange-and-hub member, and has provided on the outer or free end of the hub portion of the spring-housing the same projections, as mentioned before, for nesting within the hub portion of the brush-carrying flange-and-hub member.

A further aspect or feature of the present invention is a certain novel strain-relieving means within the hub portion of the brush-carrying flange-and-hub member, whereby the inner anchored end of the cord is so held as to relieve the electrical terminals therewithin of the strain when the cord is fully extended.

A further feature of the present invention is a reel-support including a cord-guard extending across the outer periphery of the cord-storage portion of the reel in close proximity thereto, whereby the cord is prevented from accidentally jumping out of the cord-storage space due to centrifugal force or otherwise.

Another aspect of my present invention is a construction whereby the reel may be converted from a two-conductor to a three-conductor reel.

In the accompanying drawings, in which like reference characters indicate like parts, FIGURE 1 represents a perspective view of one embodiment of the present invention.

FIGURE 2 represents an elevational view of the same, as viewed at a right angle to the axis thereof, and shown on a scale larger than that of FIGURE 1.

FIGURE 3 represents an elevational view of the same on line 3—3 of FIGURE 2.

FIGURE 4 represents an elevational view of the same on line 4—4 of FIGURE 2.

FIGURE 10 represents a cross-sectional view on line 10—10 of FIGURE 5.

FIGURE 11 represents an exploded perspective view of the embodiment of the invention shown in FIGURES 1 to 4, inclusive, but with the removable and interchangeable cord-flanking and cord-confining discs omitted.

FIGURE 12 represents the pawl-face of the metallic spring-enclosing member or spring-cover.

FIGURE 13 represents a view similar to FIGURE 12, but with the pawl-engaging notched disc shown in operative juxtaposition to the pawls and with the portion of the arbor (on which such disc is mounted) shown in cross-section.

FIGURE 14 represents an elevational view of the brush-carrying hub-and-flange member, showing its inner face.

FIGURE 15 represents an elevational view taken generally on line 15—15 of FIGURE 5, with the metallic spring-enclosing cover removed, and showing the inner spring-anchorage in the arbor and the outer spring-anchorage in the outer cylindrical portion of the spring-housing.

FIGURE 16 represents an elevational view on a line 16—16 of FIGURE 15, on an enlarged scale, to illustrate the outer spring-anchorage.

FIGURE 17 represents a cross-sectional view on line 17—17 of FIGURE 16, on a similarly enlarged scale.

FIGURES 18, 19 and 20 represent elevational views at a right angle to the reel-axis of three spring-housing members of successively larger axial dimensions, in operative juxtaposition to the same brush-carrying hub-and-flange member; illustrating the manner in which the same brush-carrying hub-and-flange member may be used with several alternative spring-housing members, namely, a spring-housing member having no hub portion as in FIGURE 18 (and as in FIGURES 1 to 11, inclusive) and a spring-housing member having a short hub portion matching and inter-nesting with the hub portion of the brush-carrying member as shown in FIGURE 19, and a spring-carrying member having a long hub portion, as in FIGURE 20, matching and inter-nesting with the hub portion of the same brush-carrying member; whereby varying lengths of cord may be accommodated within the same flange-diameter and with the same basic components.

FIGURE 21 represents a perspective view of the three-conductor aspect or embodiment of my invention.

FIGURE 22 represents a fragmentary elevational view on an enlarged scale, of the terminal-carrying hub-and-flange member of the three-conductor embodiment, showing its inner face.

FIGURE 23 represents a cross-sectional view of the three-conductor cord-on-cord embodiment of my invention, on line 23—23 of FIGURE 22.

FIGURE 24 represents an elevational view of the combined terminal and sweep-contact member for the third conductor.

FIGURES 25 and 26 represent elevational views of the same, viewed on lines 25—25 and 26—26 (respectively) of FIGURE 24.

Figure 5:
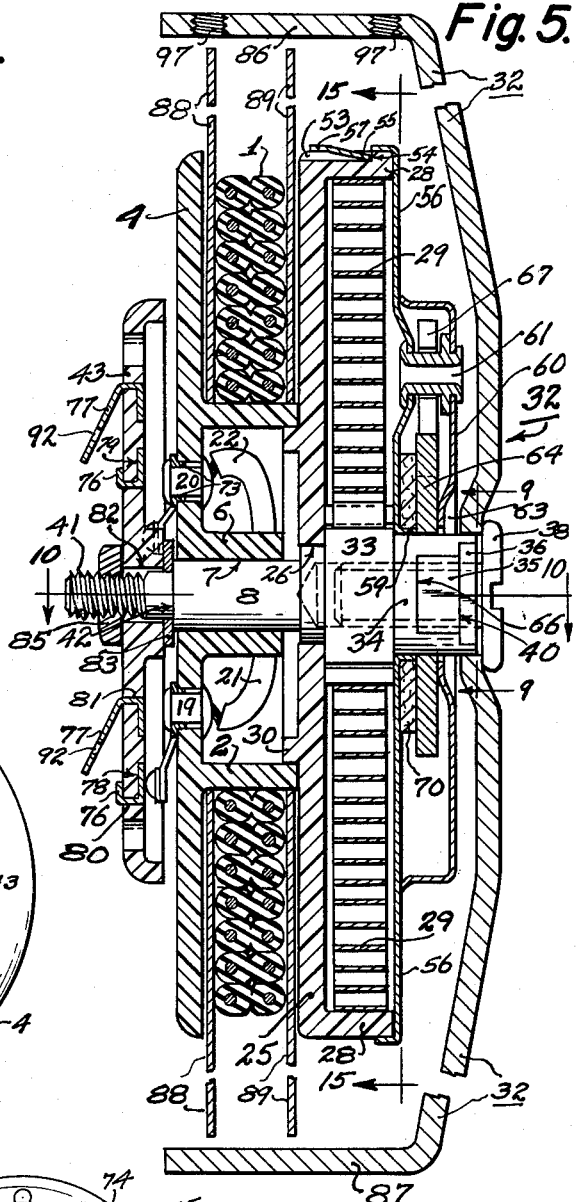
FIGURE 5 represents a cross-sectional view on line 5—5 of FIGURE 3, on an enlarged scale.

In the embodiment of the invention shown in FIGURES 1 to 6 and 10, 11 and 18, the 2-conductor-cord, preferably a flat 2-conductor cord as illustrated particularly in FIGURES 1, 2, 5, 6, 7 and 14, is wound upon itself so that the wound cord lies in a single spiral between flanges spaced from each other a distance which is sufficiently close to the width of the cord 1 if it is a flat cord and sufficiently close to the diameter of the cord if it is a round cord, to prevent successive convolutions of the reeled cord from lying alongside each other, and confining successive convolutions so that they must lie one on top of the other as illustrated particularly in FIGURE 5.

In this embodiment of the invention (as distinguished from the embodiments illustrated in FIGURES 19 and 20), a single hub portion 2 is provided, forming an integral part of the brush-carrying hub-and-flange member designated generally by the numeral 3 (FIGURES 5 and 11).

The brush-carrying hub-and-flange member 3 is molded of an insulating plastic material such as Bakelite or of a thermoplastic insulating material or of thermo-setting insulating material, and includes, in addition to the hollow and generally cylindrical hub portion 2 thereof, the cord-confining flange 4 extending outwardly from the hub 2 and the brush-carrying portion 5 extending inwardly from the hub and formed in continuation of the cord-confining flange 4.

The brush-carrying hub-and-flange member 3 also includes the central bushing-like bearing member 6 having an axial bearing hole 7 therethrough which is journalled on the portion 8 of the stationary arbor 9.

Within the hollow cylindrical sub portion, two screw-receiving portions or bosses 10 and 11 are provided, having therein screw-clearance holes 12 and 13 through which the screws 14 and 15 extend; the outer ends of the holes 12 and 13 (as viewed in FIGURE 11) being enlarged (to the depth of the screw-head) so that the heads of the screws may nest therein. The screws 14 and 15 are threaded into the holes 16 and 17 in the molded spring-housing member 16. The holes 16 and 17 may be unthreaded holes of a diameter suitable for self-tapping screws, and the screws, and the screws 14 and 15 may be corresponding self-tapping screws.

At diametrically opposite points, stationary electrical terminals 19 and 20 are extended through corresponding holes in the disc-like brush-carrying portion 5 of the hub-and-flange member 3; the diametral line between the terminals 19 and 20 being at a right angle (more or less) to the diametral line between the screw-holes 12 and 13.

The ends of the insulated conductors 21 and 22 of the cord 1 are affixed to the terminals 19 and 20 by being soldered thereto (or by other suitable means). The distance or the gap 23 between the central bearing bushing 6 and the screw-receiving boss 10 is such that when the insulated conductor 22 is disposed within such gap, the juxtaposed curved portions 6 and 10 having a frictional engagement with or a snugging action on the insulating sheathing of the conductor 22, so as to resist any outward pull thereon and so relieve the strain, on the soldered ends of the conductors 21 and 22 when the cord 1 is fully extended.

A gap 24 is provided in the cylindrical wall of the hub portion 2, of a width more or less neatly fitting the cord 1 as a whole. This, augments the aforementioned snubbing and strain-relieving action on the conductor 22.

The spring-housing 18 includes a cord-confining flange 25, having a central bearing-aperture 26 therein which is adapted to be journaled on the portion 27 of the stationary arbor 9, and has an outer cylindrical portion 28 surrounding the spring 29, as indicated in FIGURE 5. A co-axial annular centering rib or flange 30 extends axially from the cord-confining flange 25 of the spring-housing 18 and is adapted snugly to nest in the cylindrical hub portion 2 of the flange-and-hub member 3 to a suitable depth as indicated in FIGURE 5, so as to maintain the two flange members 3 and 18 in co-axial relation with each other. A keying projection 31 extends axially from the flange 25, adjacent to the annular nesting portion 30 thereof (as indicated in FIGURE 11) and in registration with the gap or recess 24 in the cylindrical hub portion 2 of the member 3, and is adapted to enter and nest within said gap or recess 24, thereby to interlock the two members 3 and 18 against rotation relative to each other. The keying projection 31 may be of any suitable axial extent and may also serve further to confine or frictionally to grip the cord 1 at the point where it passes through the cylindrical hub portion 2, so as to augment the strain-relieving effect of the snubbing action hereinabove described.

The arbor 9 is stationarily mounted to the mounting bracket 32, in the manner indicated hereinafter, and includes, in addition to the aforementioned journal portions 8 and 27, the spring-anchorage portion 33, the cylindrical journal portion 34, the pair of flats 35 and the pair of flats 36 spaced closer to each other and the flats 35.

The end of the arbor 9 having pairs of flats 35 and 36 is provided with a central screw-threaded hole 37 adapted to receive the stem of the headed screw 38. The bracket 32 is provided with an elongated opening 39 whose width corresponds to the distance across the pair of the flats and whose length corresponds to the transverse length of the end of the arbor 9 where the flats 36 are provided thereon, and the axial dimension of the flats 36 is preferably just slightly less than the wall-thickness of the bracket 32 adjacent the hole 39, so that when the end of the arbor is inserted into the hole 39, in the manner indicated in FIGURES 5 and 10, and the screw 38 is threaded into the hole 37 and tightened, the bracket will be firmly gripped between the pair of shoulders 40 (between the flats 35 and 36) and the head of the screw 38, thereby rigidly securing the arbor to the bracket at a right angle thereto, as indicated in FIGURES 5 and 10.

The opposite or free end of the arbor 9 is provided with a screw-threaded extension or terminal portion 41, of a diameter sufficiently smaller than the diameter of the journal portion 8 thereof, so as to form therebetween an annular offset or shoulder 42 against which the stationary contact-bearing member 43 may be secured in the manner indicated in FIGURES 5, 10 and 11.

In the spring-anchorage portion 33 of the arbor 9, a slot 44 is provided at a suitable angle (FIGURE 15) as, for instance, tangent to the cylindrical surface 34 of the arbor, into which the bent-back hook-shaped terminal portion 45 of the spring 29 may be engaged so as to anchor the inner end of the spring to the stationary arbor. If desired, a duplicate oppositely-facing slot 44a may also be provided in the anchorage portion 33 of the arbor, in order to accommodate an oppositely-wound spring, where it is desired to rotate the revolvable portions of the reel in the opposite direction for take-up.

The outer end of the spring 29 is provided with a pair of notches 46 inwardly from its parallel edges, thereby to form a terminal head 47, a neck portion 48 and shoulders 49 intermediate the head portion 47 and the neck portion 48.

In the outer peripheral cylindrical portion 28 of the spring-housing 25, an elongated slot 50 is provided of a width slightly greater than the width of the neck portion 48 at the outer end of the spring 29, as indicated in FIGURES 16, 17 and 2. A recess 51 is provided transversely of the elongated slot 50 and to a suitable depth (as, for instance, approximately half the wall-thickness of the cylindrical peripheral portion 28), thereby forming a pair of opposite shoulders 52 against which the shoulders 49 on the end of the spring 29 may abut for anchoring the end of the spring to the spring-housing the flange member 18, as indicated in FIGURES 15 and 17. To insert the free outer end of the spring into the opening 50, it is turned at a right angle to that shown in FIGURES 15 and 17 and then inserted through the slot 50, and is thereafter turned back to its position shown in the drawings; whereupon the head portion 47 nests in the transverse recess 51 (as indicated in FIGURES 16 and 17) with the shoulders 49 thereof abutting the shoulders 52 of the spring-housing and thereby anchoring the outer end of the spring to the spring-housing cord-flange member 18.

In the outer surface of the cylindrical portion 28 of the cord-flange member 18 a plurality of circumferentially distributed recesses 53 are provided of the suitable depth and having shoulders 54 against which the ends of the spring-tangs or detents 55 may abut, so as to lock the sheet-metal cover 56 to the dielectric member 18 in the manner indicated in FIGURE 5. The sheet-metal member 56 is flanged (as indicated in FIGURES 1, 2, 5, 6, 11 and 12) and forms a cover or closure for the spring-housing portion of the dielectric flange member 18, and also constitutes one of the two housing members for the cord-control means described hereinafter.

The flanged sheet-metal member 56 is provided with a plurality of circumferentially distributed flange portions or flange extensions 57 at a radius just slightly greater than the radius of the outer surface of the cylindrical peripherial portion 28 of the spring-housing cord-flange member 18, and from these tab-like flange portions 57 spring fingers, tangs or detents 55 are pressed and formed inwardly as is indicated in FIGURES 1, 2, 5, 6 and 11, so that when the tab-like peripherial portions 57 are telescoped over the cylindrical peripherial portion 28 of the dielectric 18, the spring-tangs 55 will snap into the recesses 53 in the flange 28, with the free ends thereof abutting against the outer shoulders 54 of the recesses 53 thereby locking the sheet-metal member 56 to the spring-housing cord-flange member 18.

The sheet-metal member 56 has a central aperture 58 formed with a slight cylindrical flange 59 which is adapted to be journalled on the cylindrical portion 34 of the arbor 9, as indicated in FIGURES 5 and 10.

An outer sheet-metal ratchet-housing member 60 is mounted to the sheet-metal housing member 56 by means of a plurality of tubular or other suitable rivets 61, as indicated in FIGURE 5. A central hole 62 is provided in the outer ratchet-housing 60, of a diameter to clear a diameter of a cylindrical portion 34 of the arbor 9, as indicated in FIGURE 5, and around this central clearance hole 62, an annular portion 63 of the member 60 is dished inwardly as indicated in FIGURES 5 and 10. The ratchet wheel or disc 64 has an elongated central opening 65 adapted to fit snugly over the flats 35 and cylindrical arbor portion therebetween, as indicated in FIGURES 5, 10, 11 and 13, and to abut against shoulders 66 between the flats 35 and the cylindrical bearing or journal portion 34 of the arbor 9 or to bear against the fiber (or other suitable) spacer washer or disc 70. The ratchet disc 60 is thus confined between the shoulders 66 and the inwardly dished annular portion 63 of the ratchet housing 60 (FIGURE 5) yet with sufficient working clearance so as not to "bind" but to permit the ratchet housings to revolve freely about the arbor.

In the embodiment shown in the drawings, the portions of ratchet disc 64 along the straight sides of the hole 65 therethrough, are pressed outwardly so that the "flats" 65 of the hole 65 are offset in an outward direction, as indicated in FIGURES 10 and 11 and so that the ratchet-disc 64 is confined between the washer 70 and the dished annular portion 63 of the outer ratchet-housing member 60 as indicated in FIGURES 5 and 10.

Upon the rivets 61, the pawls 67 are pivotally mounted (FIGURES 5, 12 and 13) with the detents 68 thereof adapted to engage in the notches 69 of the ratchet disc 64 under the influence of gravity or otherwise. In the embodiment shown, the cord-control means is actuated by gravity to stop the retraction or rewinding rotation of the reel and is operated by centrifugal force to disengage the pawls 67 from the ratchet disc 64 when it is desired to have the cord retracted. Instead of the cord-control means shown in the drawings I may use alternative cord-control means such as, for example, shown in my Patent 2,391,840.

The terminal-members 19 and 20 are preferably hollow or tubular rivets passing through square or rectangular cross-sectioned holes in the terminal-carrying cord-flange member 18, and to the outer ends of the terminal-rivets 19 and 20 a pair of similar leaf-spring contact-brush members 71 and 72 are secured in the manner indicated in FIGURE 5; each having a pair of oppositely extending outwardly-bowed resilient spring-fingers with suitable contact-buttons on the free ends thereof for resiliently bearing against the outer and inner collector-rings 74 and 75, respectively. The contact-brush members are provided with slight inwardly-bent flat locking-flanges 73 extending into the square holes in which the terminal-rivets are mounted, thereby to maintain the orientation of the brush members in their pre-determined relation to the collector-rings 74 and 75, respectively.

The collector-rings 74 and 75 are preferably stamped out of flat sheet metal, such as copper, bronze or other suitable metal, of suitable thickness and each is provided with a crimp-tab 76 and a terminal-tab 77, each of which is straight and disposed at a right angle to the plane of a collector-ring when first formed and prior to assembly to the dielectric ring-supporting member 43, The member 43 is provided with annular recesses 78 and 79 in which the collector-rings 74 and 75 snugly nest. Holes 80 and 81 are extended through the ring-supporting member 43 for the passage of the crimp-tabs 76 and the terminal-tabs or members 77, respectively. These tabs are passed through the holes 80 and 81 as the rings are mounted in their annular recesses 78 and 79, and thereafter the crimp-tabs 76 are crimped over and the terminal members 77 are bent over at a suitable angle, as indicated in FIGURE 5, thereby securing the rings in their recesses and providing the outer stationary terminals 77 extending from outer surface of the moulded dielectric member 43.

The member 43 is provided with a central hole 82 which is telescoped over the screw-threaded portion 41 of the arbor 9, with a split-ring helical lockwasher 83 (or any other suitable lockwasher or the like) interposed between the shoulder 42 on the arbor and the inner flat thrust-face 84 of the member 43. A nut 85 threaded onto the terminal portion 41 of the arbor and tightened against the outer thrust-surface of the member 43 secures the member 43 and the collector-rings 74 and 75 and terminals 77 thereof stationarily in respect to the arbor 9 and bracket 32.

The bracket 32 is provided with a pair of flanges 86 and 87 disposed generally parallel to the axis of the arbor 9, and preferably spaced equidistantly therefrom and at a distance from the axis of the arbor only slightly greater than the radius of the cord-confining flanges 4 and 25 or of the cord-confining discs 88 and 89 described hereinafter. The flanges 86 and 87 serve the dual function of mounting means whereby the reel may be mounted to a wall or structural element of the equipment or appliance to be supplied with electric power through the cord 1 of the reel, and of confining the cord between the flanges 4 and 25 or between the discs 88 and 89, so that it cannot jump out as it is rewound rapidly without any tension on the cord.

To increase the cord-capacity of the reel, relatively thin and generally form-retaining discs 88 and 89, formed of an insulating or dielectric material (such as hard-pressed fiber sheet or other suitable insulating sheet material) having central holes therethrough just sufficient to telescope over the hub 2 of the reel, are placed between the flanges 4 and 25, on either side of the cord 1, as indicated in FIGURES 2 and 5. The same reel may be provided with two or three successively larger cord-capacities. The minimum cord-capacity would be that provided by the diameters of the cord-flanges 4 and 25 in relation to the diameter of the hub 2. Thereafter, a pair of discs 88 and 89 suitably larger diameter may be inserted between the flanges 4 and 25 and if a still larger cord-capacity is desired, a still larger pair of discs 88 and 89 is similarly mounted on the hub 2, as indicated in FIGURE 5. The distance between the flanges 86 and 87 of the mounting 32 is correspondingly increased, so that in each instance the flanges 86 and 87 will be spaced but a short distance from the outer periphery of the discs 88 and 89. Hence, the same cord-reel structure may be made to accommodate cords of different lengths, by merely mounting a pair of disks 88 and 89 of suitable diameter on the hub 2 and by changing the bracket 32 to one whose flanges 86 and 87 are spaced a distance corresponding to the diameter of the discs 88 and 89.

In the aspect of my invention shown in FIGURES 19 and 20, the cord-capacity is increased by lengthening the overall distance between the cord-flanges 4 and 25, by providing the spring-housing cord-flange member 18 with hub portions of different lengths, as for instance the hub portion 90 in FIGURE 19, or the hub portion 91 in FIGURE 20. Each of the hub portions 90 and 91 is of the same diameter of the hub 2, and has an annular centering flange 30 similar to that shown in FIGURES 5 and 11, and a keying projection 31 similar to that shown in FIGURES 11 and 18. In this embodiment of my invention, the cord 1 is wound in successive layers, each convolution of the cord side-by-side in the manner customary on conventional cord reels. In the embodiment indicated in FIGURES 19 and 20 the distance between the flanges 86 and 87 of the mounting-bracket 32 remains constant, that is, spaced at a distance just slightly greater than the diameter of the cord-flanges 4 and 25 but the length of the flanges 86 and 87 is successively increased so as to extend across the successively wider cord-storage spaces between the cord-flanges 4 and 25. In this embodiment, the length of the journal-portion 8 of the arbor 9 is correspondingly increased to accommodate the additional axial length of the combined hub (2 and 90 or 2 and 91).

An electric-terminal tab 77 may be provided with small holes 92, through which the ends of the wires 93 may be extended and then soldered in place. Alternatively, socket-type slip-on connectors 94 may be telescoped over the terminal tabs 77 for providing readily attachable or detachable electrical connections between the wires 93 and the terminal tabs 77.

Figure 6:
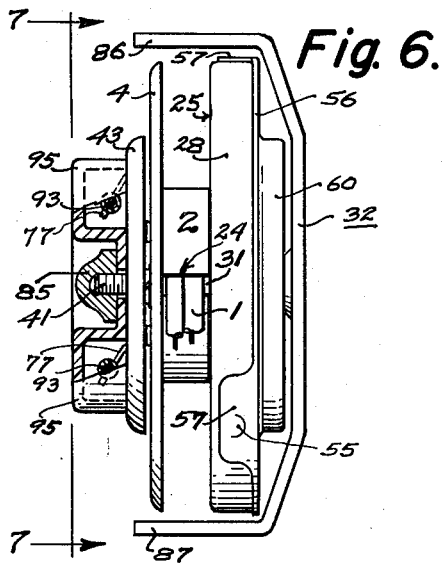
FIGURE 6 represents a view similar to that shown in FIGURE 2 but without any removable cord-confining discs and with the reel-supporting and cord-guiding bracket having its ends spaced from each other at a distance but slightly larger than the basic or "permanent" reel-diameter, and also showing an alternative constructional feature for enclosing the stationary electrical terminals.
Figure 7:
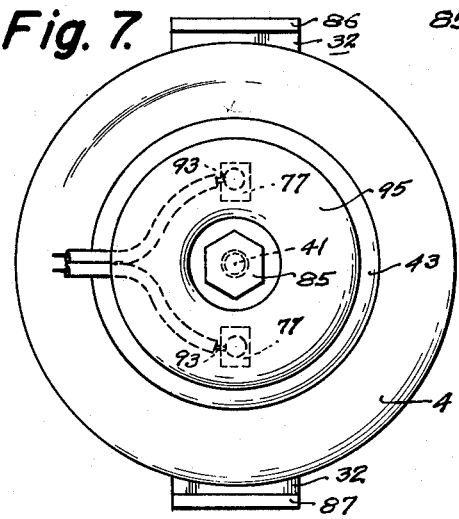
FIGURE 7 represents an elevational view on line 7—7 of FIGURE 6.
Figures 8, 9:
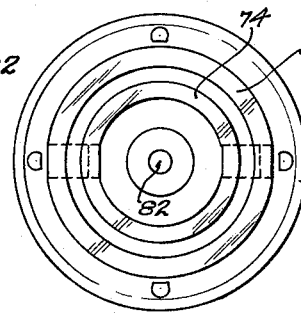
FIGURE 8 represents an elevational view of the face of the stationary collector-ring member, showing the collector-rings recessed therein.
FIGURE 9 represents a fragmentary cross-sectional view on line 9—9 of FIGURE 5.

A moulded dielectric terminal-cap 95 is placed over the terminal-tabs 77 and the ends 93 of the wires secured thereto, in the manner indicated in FIGURES 6 and 7; the cap 95 being provided with a notch 96 through which the wires 93 extend outwardly to the terminals of the appliance to be wired thereto. The cap 95 is stationarily secured to the arbor in the manner indicated in FIGURES 6 and 7.

A pair of screw-threaded holes 97 are provided in one or both of the bracket-flanges 86 and 87, whereby the brackets may be secured to the appliance or the housing of the appliance to be wired through the cord-reel.

A cord-pay-out grommet 110 is provided in the housing or wall of the appliance or device in which the reel is mounted or in a grommet-mounting plate 111 to be secured to such appliance.

While in FIGURES 19 and 20 only the terminal-carrying cord-flange member 3 and the spring-housing cord-flange member 18 are shown, it is to be understood that the reel of the embodiment of my invention indicated in FIGURES 19 and 20 include all the other elements shown in the other figures of the drawings and described in the specification, excepting that it does not include the capacity-enlarging discs 88 and 89 and, instead, the length of the lateral reel-mounting and cord-guard flanges 86 and 87 of the bracket 32 is increased so as to extend across the cord-storage space between the dielectric cord-flanges 4 and 25 of the members 3 and 18.

In the three-conductor cord-on-cord aspect or embodiment of my invention illustrated in FIGURES 21 to 26 inclusive, the cord 1 includes, in addition to the insulated conductors 21 and 22, a third conductor 98, which may be either a ground conductor or a live conductor. If it is used as a live conductor, then the bracket 32 is mounted on an insulating or insulated support or is secured to its support in insulated relation thereto (or the support to which it is secured is insulated in relation to other portions of the appliance or equipment served by the cord reel).

In this embodiment or aspect of my invention, I provide a combined terminal and sweep-contact member 99 shown separately in FIGURES 24, 25 and 26, preferably formed of resilient sheet-metal, such as a Phosphor bronze or hard brass with sufficient resiliency or spring-like quality to provide the sweep contact hereinafter described.

The member 99 includes a terminal tab or portion 100 and a sweep-contact tab or portion 101 disposed transversely of each other and with the included angle therebetween suitably in excess of 90° so that when the member 99 is operatively mounted in the cord reel (as indicated in FIGURE 23) the two portions 100 and 101 thereof are deflected towards each other until they are at approximately 90° to each other, so that the sweep-contact portion 101 thereof will be resiliently urged in an outward contacting direction towards the annular radial shoulder 102 of the arbor 9 which is intermediate the two differently diametered journal portions 27 and 8 thereof, as indicated in FIGURE 23.

The third conductor 98 has the end-portion of its wire bared and slipped through a loop-like or other suitable wire-anchored member 103 pressed out of the terminal tab 100, and may be secured thereto by being bent back upon itself and twisted together or by being soldered thereto or by being clamped by squeezing the loop-like member portion 103 towards the tab 100 of which it is formed until it firmly clamps the bared wire end of the third conductor 98.

The sweep-contact tab 101 is preferably formed as an annulus, having a central hole 104 therein, surrounded by an axially extending contact-flange 105 which is adapted to bear against the aforementioned shoulder 102 of the arbor 9 so as to maintain sweep-contact therewith as the revolvable portions of the reel rotate.

The terminal and anchorage tab 100 of the member 99, with the third conductor secured thereto, is inserted into the space or recess 106 between the boss 11 and the bushing-like bearing member 6 of the terminal-carrying cord-flange member 3.

The terminal-carrying cord-flange member 3, with the bared end of the three conductors 21, 22 and 98 of the cord 1 affixed in a manner indicated in FIGURE 22, is then mounted on the journal portion of the arbor 9 in the manner indicated in FIGURE 23; the spring-housing cord-flanged member 18 (with the spring 29 therein and with a cover 56 thereon) having previously been mounted on the arbor 9 and the latter mounted on the bracket 32.

In the three-conductor aspect of my invention (whether of the cord-on-cord embodiment thereof shown in FIGURES 21, 22 and 23 or of the conventionally winding embodiment thereof corresponding to FIGURES 19 and 20) the spring-housing cord-flange member 18 is also provided with a hub-portion 10 of an axial extent just sufficient to accommodate the additional width of the three-conductor cord shown in FIGURES 21 and 23. If the three-conductor cord is of the flat type indicated in FIGURES 21 and 23, then the hub-portion 107 of the spring-housing cord-flange member 18 is of an axial extent approximately equal to ⅓ the width of the three-conductor cord 1 or equal to the difference between its width and that of the corresponding flat two-conductor cord. If the three-conductor cord is a round cord of a diameter not substantially greater than the diameter of the corresponding two-conductor round cord, then no hub-portion is provided on the spring-housing cord-flange member 18 in the cord-on-cord three-conductor embodiment of my invention. In the conventionally-winding three-conductor embodiment of my invention the axial extent of the capacity-increasing hub-portions 90 and 91 of the spring-housing cord-flange member 18 remain the same as in FIGURES 19 and 20 if the three-conductor cord is a round cord of generally the same diameter as that of the corresponding two-conductor. By providing a third spring-housing cord-flange member 18, with a capacity-increasing hub-portion of an axial extent still greater than that indicated in FIGURE 20, a corresponding increase in cord-capacity may be provided for the conventionally-winding three-conductor embodiment of my invention, where either a "flat" three-conductor cord is desired or where the diameter of the three-conductor round cord is greater than that of the corresponding two-conductor cord accommodated by the hub portion 91 indicated in FIGURE 20.

In either event, the sweep-contact portion 101 is accommodated between the inner end of the bushing-like bearing member 6 of the terminal-carrying cord-flange member 3 and the radially innermost portion of the generally flat radial wall 25 of the spring-housing cord-flange member 18.

In the three-conductor embodiment of my invention, one of the screw holes 97 may be used to receive a terminal-screw 108, to which the third wire 109 may be secured.

Having described my invention, I claim the following:

1. An electric cord reel including a stationarily fixed arbor, two separate molded dielectric cord-flange members revolvably mounted thereon, each having a radially extending cord-confining flange, one of said cord-flange members carrying a pair of cord-terminals on its side facing the other cord-flange member and the other having a spring-anchorage integral with the cord-flange thereof and extending axially from the side thereof opposite to that facing the terminal-carrying cord-flange member, at least one of said two cord-flange members including a hollow cord-hub integral and co-axial therewith and having a cord-passage opening therethrough, complementary inter-nesting means on the free end of said cord-hub and integral therewith and on the juxtaposed portion of the other cord-flange member and integral therewith for maintaining the two cord-flange members in co-axial relation to each other, means for maintaining said two cord-flange members in non-revolvable relation to each other, a journal bearing integral with at least one of said cord-flange members, means securing said two cord-flange members to each other in an axial direction, a pair of rotary sweep-contacts carried on the outer side of said terminal-carrying cord-flange member and conductively connected with said cord-terminals, a spiral spring having its outer end anchored to said spring-anchorage and having its inner end anchored to the arbor, a generally radially extending sheet-metal member having axially extending resilient snap-fastener portions in telescopic relation to the cord-flange member having said spring-anchorage, and complementary means on the last-mentioned cord-flange member for interlocking with said snap-fastener portions to secure said cord-flange member and said sheet-metal member to each other in an axial direction and against relative rotation.

2. An electric cord reel including a stationarily fixed arbor, two separate molded dielectric cord-flange members revolvably mounted thereon, each having a radially extending cord-confining flange, one of said cord-flange members carrying a pair of cord-terminals on its side facing the other cord-flange member and the other having a spring-anchorage flange integral with the cord-flange thereof and extending axially from the side thereof opposite to that facing the terminal-carrying cord-flange member, at least one of said two cord-flange members including a hollow cord-hub integral and co-axial therewith and having a cord-passage opening therethrough, complementary inter-nesting means on the free end of said cord-hub and integral therewith and on the juxtaposed portion of the other cord-flange member and integral therewith for maintaining the two cord-flange members in co-axial relation to each other, means for maintaining said two cord-flange members in non-revolvable relation to each other, a journal bearing integral with at least one of said cord-flange members and journaled on said arbor, means securing said two cord-flange members to each other in an axial direction, a pair of rotary sweep-contacts carried on the outer side of said terminal-carrying cord-flange member and conductively connected with said cord-terminals, a spiral spring within said spring-anchorage flange and having its outer end anchored thereto and having its inner end anchored to the arbor, a generally radially extending sheet-metal member having an arbor-receiving hole therethrough and having axially extending resilient snap-fastener portions in telescopic relation to said spring-flange, complementary means on said spring-anchorage flange for interlocking with said snap-fastener portions to secure said spring-anchorage flange and said sheet-metal member to each other in an axial direction and against relative rotation, and cord-control means secured to the outer side of said sheet-metal member.

3. An electric cord reel including a stationarily fixed arbor, two separate molded dielectric cord-flange members revolvably mounted thereon, each having a radially extending cord-confining flange, a pair of cord-terminals on the radial wall of one of said cord-flange members and extending through the radial wall thereof, rotary sweep-contacts on the outer side of said radial wall conductively connected with said cord-terminals, the other of said cord-flange members including a spring-anchorage flange integral with the cord-flange thereof and extending axially from the side thereof opposite to that facing the terminal-carrying cord-flange member, at least one of said two cord-flange members including a hollow cord-hub integral and co-axial therewith and having a cord-passage opening extending radially therethrough, complementary inter-nesting means on the free end of said cord-hub and integral therewith and on the juxtaposed portion of the other cord-flange member and integral therewith for maintaining the two cord-flange members in co-axial and non-revolvable relation to each other, a two-conductor cord extending through said opening in the cord-hub and having its conductors affixed to the aforementioned terminals, the two cord-confining flanges of said cord-flange members being spaced from each other a distance substantially less than twice the maximum cross-sectional dimension of said cord and sufficiently greater than said maximum cross-sectional dimension so that when the cord is wound about said hub, the aforementioned cord-confining flanges will confine the successive convolutions of the cord to a single spiral in which each successive convolution of the cord lies on the previous convolution thereof, a spiral spring adjacent the cord-confining flange of the cord-flange member having said spring-anchorage flange, said spring having its inner end anchored to the arbor and having its outer end anchored to said spring-anchorage flange, a sheet-metal member in operative juxtaposition to the aforementioned spring-anchorage flange and having axially extending resilient snap-fastener means in telescopic relation to said spring-anchorage flange, and complemetary means on said spring-anchorage flange for interlocking with said snap-fastener means to secure said spring-anchorage flange and said sheet-metal member to each other in an axial direction and against relative rotation.

4. An electric cord reel including a stationarily fixed arbor, two separate molded dielectric cord-flange members revolvably mounted thereon, each including a radially extending cord-confining flange, one of said cord-flange members carrying a pair of cord-terminals on its side facing the other cord-flange member and the other including a spring-housing flange integral with the cord-flange thereof and extending axially from the side thereof opposite to that facing the terminal-carrying cord-flange member, said spring-housing flange having a circumferentially extending elongated hole therethrough of a width substantially less than the width of the below-mentioned spiral spring and having a recess extending inwardly from the outer surface thereof and communicating with said elongated hole and forming an anchorage-shoulder transversely of said elongated hole, a flat spiral spring having a notch in its edge near the outer end thereof forming a narrowed neck portion near the free end thereof of a width less than the axial width of the aforementioned elongated hole and forming an anchorage-shoulder at the outer end of such narrowed neck portion, whereby said outer end of the spring may be inserted into said elongated hole while the cross-section thereof is disposed generally in the direction of the elongated hole and whereby said free end of the spring becomes anchored in said elongated hole when the cross-section of the spring is turned at a right angle to the direction of said elongated hole, with the aforementioned anchorage-shoulder of the spring abutting the aforementioned anchorage-shoulder in said spring-housing flange adjacent the elongated hole therein; the inner end of said spring being anchored to said arbor.

5. An electric cord reel including a stationarily fixed arbor, two separate molded dielectric cord-flange members revolvably mounted thereon, each including a radially extending cord-confining flange integral therewith, at least one of said two cord-flange members including a hollow cord-hub integral and co-axial therewith and having a cord-passage opening extending radially therethrough, a pair of cord-terminals on the radial wall of one of said cord-flange members within said cord-hub, rotary sweep-contacts on the outer side of said radial wall conductively connected with said cord-terminals, complementary inter-nesting means on the free end of said cord-hub and on the juxtaposed portion of the other cord-flange member for maintaining the two cord-flange members in co-axial and non-revolvable relation to each other, means securing said two cord-flange members to each other in an axial direction, a pair of thin form-retaining cord-capacity-enlarging discs mounted between said cord-confining flanges, said discs having a diameter substantially greater than the diameter of the cord-confining flanges, each of said discs being adjacent to one of said cord-confining flanges, and a multi-conductor cord disposed between said discs and extending through said opening in the cord-hub and having its conductors affixed to the aforementioned terminals; the two cord-confining flanges of said cord-flange members being spaced from each other a distance substantially less than twice the maximum cross-sectional dimension of said cord and sufficiently greater than said dimension, and said discs being sufficiently thin, so that when the cord is wound about said cord-hub, between the aforementioned discs, backed by said cord-confining flanges, will confine the successive convolutions of the cord to a single spiral in which each successive convolution of the cord lies on the previous convolution thereof, and so that said cord-confining flanges will alone, namely, without the intervention of said discs, likewise confine the successive convolutions of the cord to a single spiral in which each successive convolution of the cord lies on the previous convolution thereof.

6. An electric cord reel including a stationarily fixed arbor, two separate molded dielectric cord-flange members revolvably mounted thereon, each having a radially extending cord-confining flange, one of said cord-flange members carrying an electric terminal and the other having a spring-anchorage carried by the cord-flange thereof and extending axially from the side thereof opposite to that facing the terminal-carrying cord-flange member, at least one of said two cord-flange members including a hollow cord-hub integral and co-axial therewith and having a cord-passage opening therethrough, means securing the two cord-flange members to each other in co-axial and non-revolvable relation to each other, a journal bearing integral with at least one of said cord-flange members, a rotary sweep-contact carried by said terminal-carrying cord-flange member and conductively connected with said electric terminal thereof, a spiral spring having its outer end anchored to said spring-anchorage and having its inner end anchored to the arbor, a generally radially extending sheet-metal member having axially extending resilient snap-fastener portions in telescopic relation to the cord-flange member having said spring-anchorage, and complementary means on the last-mentioned cord-flange member for interlocking with said snap-fastener portions to secure said cord-flange member and said sheet-metal member to each other in an axial direction and against relative rotation.

7. An electric cord reel including a stationarily fixed arbor, two separate molded dielectric cord-flange members revolvably mounted thereon, each having a radially extending cord-confining flange, one of said cord-flange members carrying an electric terminal and the other having a spring-anchorage connected with the cord-flange thereof and disposed axially on the side thereof opposite to that facing the terminal-carrying cord-flange member, at least one of said two cord-flange members including a hollow cord-hub integral therewith, a rotary sweep-contact carried by said terminal-carrying cord-flange member and conductively connected with the aforementioned electric terminal, a rotary sweep-contact conductively connected with said electric terminal and revolvably bearing against said arbor and forming an electrical ground therethrough, means securing said two cord-flange members to each other in co-axial and non-revolvable relation to each other, and a spiral spring having its outer end anchored to said spring-anchorage and having its inner end anchored to the arbor.

8. An electric cord reel including a stationarily fixed arbor, two separate molded dielectric cord-flange members revolvably mounted thereon, each having a radially extending cord-confining flange, one of said cord-flange members carrying at least two electric terminals and the other having a spring-anchorage connected with the cord-flange thereof and disposed axially on the side thereof opposite to that facing the terminal-carrying cord-flange member, at least one of said two cord-flange members including a hollow cord-hub integral therewith, a rotary sweep-contact carried by said terminal-carrying cord-flange member and conductively connected with one of the aforementioned electric terminals, a rotary sweep-contact conductively connected with another of said electric terminals and revolvably bearing against said arbor and forming an electrical ground therethrough, means securing said two cord-flange members to each other in co-axial and non-revolvable relation to each other, a spiral spring having its outer end anchored to said spring-anchorage and having its inner end anchored to the arbor, a generally radially extending sheet-metal member having axially extending resilient snap-fastener portions in telescopic relation to the cord-flange member having said spring-anchorage, and complementary means on the last-mentioned cord-flange member for interlocking with said snap-fastener portions to secure said cord-flange member and said sheet-metal member to each other in an axial direction and against relative rotation.

9. An electric cord reel including a stationarily fixed arbor, two separate molded dielectric cord-flange members revolvably mounted thereon, each having a radially extending cord-confining flange, one of said cord-flange members carrying an electric terminal on its side facing the other cord-flange member and a sweep-contact on its other side conductively connected with said terminal, and the other cord-flange member having a spring-anchorage connected with the cord-flange thereof and disposed axially on the side thereof opposite to that facing the terminal-carrying cord-flange member, at least one of said two cord-flange members including a hollow cord-hub integral therewith and having a cord-passage opening therethrough, another electric terminal carried by one of said cord-flange members within said cord-hub and a rotary sweep-contact conductively connected therewith and revolvably bearing against said arbor, and forming an electrical ground therethrough, means securing said two cord-flange members to each other in non-revolvable relation to each other, and a spiral spring having its outer end anchored to said spring-anchorage and having its inner end anchored to the arbor.

10. An electric cord reel including a stationarily fixed arbor, two separate molded dielectric cord-flange members revolvably mounted thereon, each having a radially extending cord-confining flange, one of said cord-flange members carrying an electric terminal on its side facing the other cord-flange member and a sweep-contact on its other side conductively connected with said terminal, and the other cord-flange member having a spring-anchorage connected with the cord-flange thereof and disposed axially on the side thereof opposite to that facing the terminal-carrying cord-flange member, at least one of said two cord-flange members including a hollow cord-hub integral therewith and having a cord-passage opening therethrough, another electric terminal carried by one of said cord-flange members within said cord-hub and a rotary sweep-contact conductively connected therewith and revolvably bearing against said arbor and forming an electrical ground therethrough, means securing said two cord-flange members to each other in non-revolvable relation to each other, a spiral spring having its outer end anchored to said spring-anchorage and having its inner end anchored to the arbor, a generally radially extending sheet-metal member having axially extending resilient snap-fastener portions in telescopic relation to the cord-flange member having said spring-anchorage, and complementary means on the last-mentioned cord-flange member for interlocking with said snap-fastener portions to secure said cord-flange member and said sheet-metal member to each other in an axial direction and against relative rotation.

11. A cord reel including a stationarily fixed arbor, two separate cord-flange members revolvably mounted thereon, each having a radially extending cord-confining flange, one of said cord-flange members having a spring-anchorage connected with the cord-flange thereof and disposed axially on the side thereof opposite to that facing the other cord-flange member, at least one of said two cord-flange members including a hollow cord-hub integral therewith, means securing said two cord-flange members to each other in co-axial and non-revolvable relation to each other, a spiral spring having its outer end anchored to said spring-anchorage and having its inner end anchored to the arbor, a generally radially extending sheet-metal member having axially extending resilient snap-fastener portions in telescopic relation to the cord-flange member having said spring-anchorage, and complementary means on the last-mentioned cord-flange member for interlocking with said snap-fastener portions to secure said cord-flange member and said sheet-metal member to each other in an axial direction and against relative rotation.

12. A cord reel including a stationarily fixed arbor, two separate molded non-metallic cord-flange members revolvably mounted on said arbor, each cord-flange member having a radially extending cord-confining flange integral therewith and at least one of said cord-flange members including a hollow cord-hub integral therewith and a cord-passage opening therethrough, cord-snubbing means within said cord-hub and integral with one of said cord-flange members for anchoring the inner end of a cord wound on said cord-hub and extending through said cord-passage, complementary inter-nesting means on said cord-hub and integral therewith and on the other cord-flange member and integral therewith, for maintaining said two cord-flange members in co-axial and non-revolvable relation to each other, a spiral spring disposed in proximity of the outer face of one of said cord-confining flanges and having its inner end anchored in relation to said arbor, and a generally radially extending sheet-metal member along the outer side of said spring-spiral, said sheet-metal member being secured to said last-mentioned cord-confining flange, resilient snap-fastener means carried by said sheet-metal member and complementary means on said last-mentioned cord-confining flange for securing the two to each other, said spring having its outer end anchored in relation to said last-mentioned cord-confining flange.

(References on following page)

References Cited by the Examiner

UNITED STATES PATENTS

| | | | |
|---|---|---|---|
| 469,895 | 3/92 | Deavs | 191—12.2 X |
| 529,654 | 11/94 | Konetshny. | |
| 1,025,026 | 4/12 | Sprague. | |
| 1,288,511 | 12/18 | Clarke | 191—12.2 |
| 1,394,382 | 10/21 | Warner | 242—118.8 |
| 1,442,999 | 1/23 | Boyle | 191—12 X |
| 1,445,217 | 2/23 | Johnson | 191—12.2 |
| 1,630,952 | 5/27 | Leschman. | |
| 1,754,072 | 4/30 | Watts | 191—12.2 X |
| 1,952,713 | 3/34 | Kelch | 185—45 |
| 2,201,305 | 5/40 | Hedfield | 118—4 X |
| 2,472,248 | 6/49 | Cox | 242—118.4 |
| 2,484,090 | 10/49 | Hedfield | 242—118.4 |
| 2,614,769 | 10/52 | Nicholson | 242—84.8 |
| 2,646,940 | 7/53 | Volz | 242—84.8 |
| 2,751,565 | 6/56 | Johnston | 191—12.2 X |

FOREIGN PATENTS

| | | |
|---|---|---|
| 434,636 | 12/11 | France. |
| 526,075 | 5/55 | Italy. |

EUGENE G. BOTZ, *Primary Examiner.*

JAMES S. SHANK, LEO QUACKENBUSH, *Examiners.*